United States Patent [19]

Johansson

[11] Patent Number: 5,455,911
[45] Date of Patent: Oct. 3, 1995

[54] COMMUNICATIONS PROTOCOL FOR USE IN TRANSFERRING DATA OVER A SERIAL BUS

[75] Inventor: Orjan Johansson, Shaker Heights, Ohio

[73] Assignee: Allen-Bradley Company, Inc., Milwaukee, Wis.

[21] Appl. No.: 43,170

[22] Filed: Apr. 5, 1993

[51] Int. Cl.⁶ .................................................. G06F 13/42
[52] U.S. Cl. ............... 395/864; 364/940.81; 364/238.5; 364/130; 395/866; 395/868
[58] Field of Search ..................................... 395/275, 200; 371/34

[56] References Cited

U.S. PATENT DOCUMENTS

| | | | |
|---|---|---|---|
| 3,995,258 | 11/1976 | Barlow | 395/229 |
| 4,016,548 | 4/1977 | Law | 364/DIG. 1 |
| 4,074,352 | 2/1978 | Cook | 395/275 |
| 4,075,691 | 2/1978 | Davis | 395/275 |
| 4,281,315 | 7/1981 | Bauer | 364/DIG. 1 |
| 4,536,839 | 8/1985 | Shah | 395/425 |
| 4,546,450 | 10/1985 | Kanuma | 395/725 |
| 4,673,976 | 6/1987 | Howard | 371/34 |
| 4,807,274 | 2/1989 | Kousa | 371/20.3 |

*Primary Examiner*—David Y. Eng
*Attorney, Agent, or Firm*—Mark W. Pfeiffer; John J. Horn; H. F. Hamann

[57] ABSTRACT

A communications protocol for use in implementing serial communications over a common system backplane in an industrial control system such as a remote I/O system. The protocol includes separate start access, read access and write access sequences. Different locations at which I/O modules may be present as defined by select line connections are polled pursuant to the start access sequence to verify the presence of such modules. Module status words and separate groups of data read words and data write words are exchanged over the system backplane in standardized data frames. As the data bits of the data words are transmitted they are echoed back to the transmitting component for error detection purposes.

6 Claims, 7 Drawing Sheets

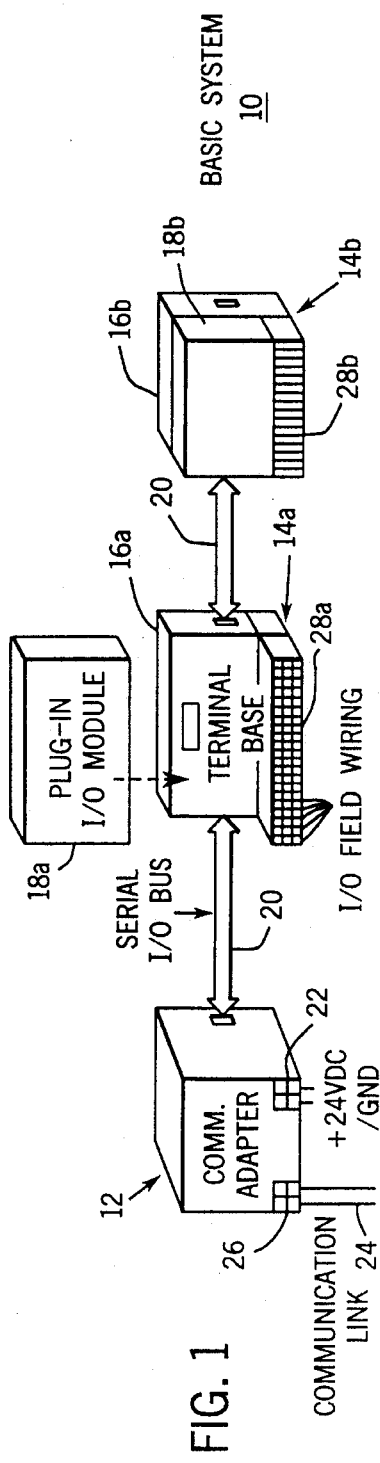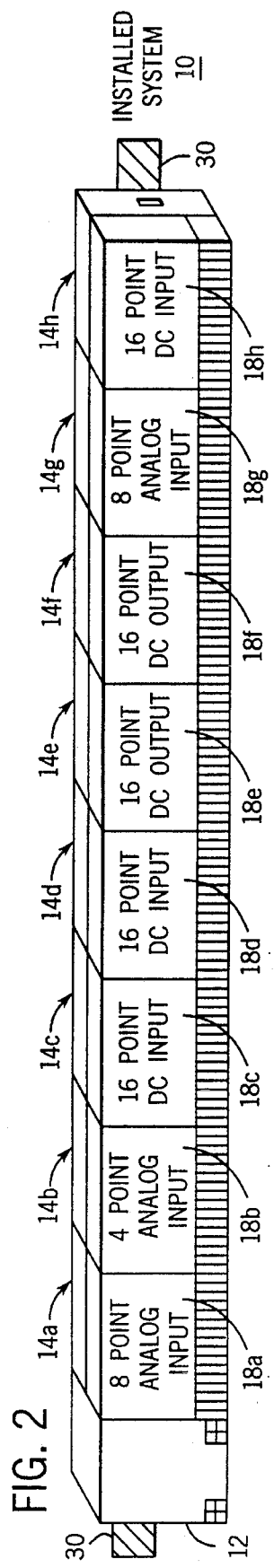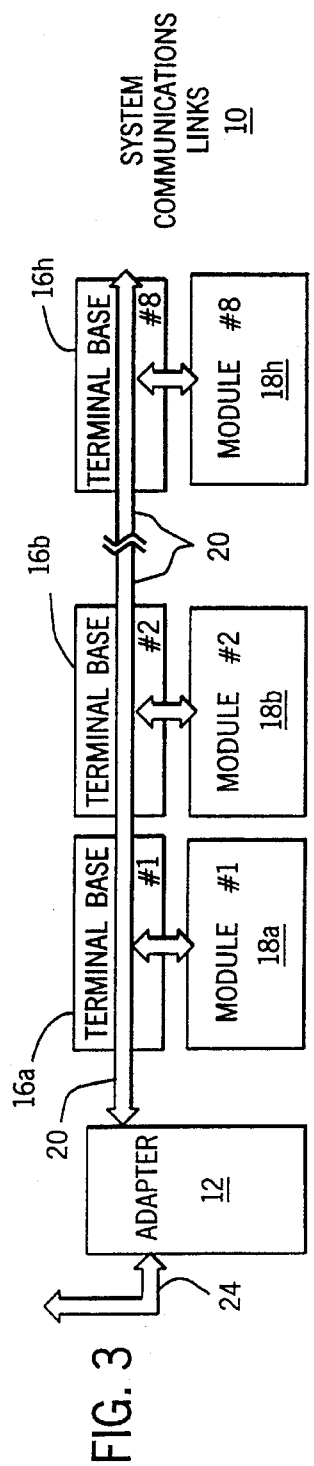

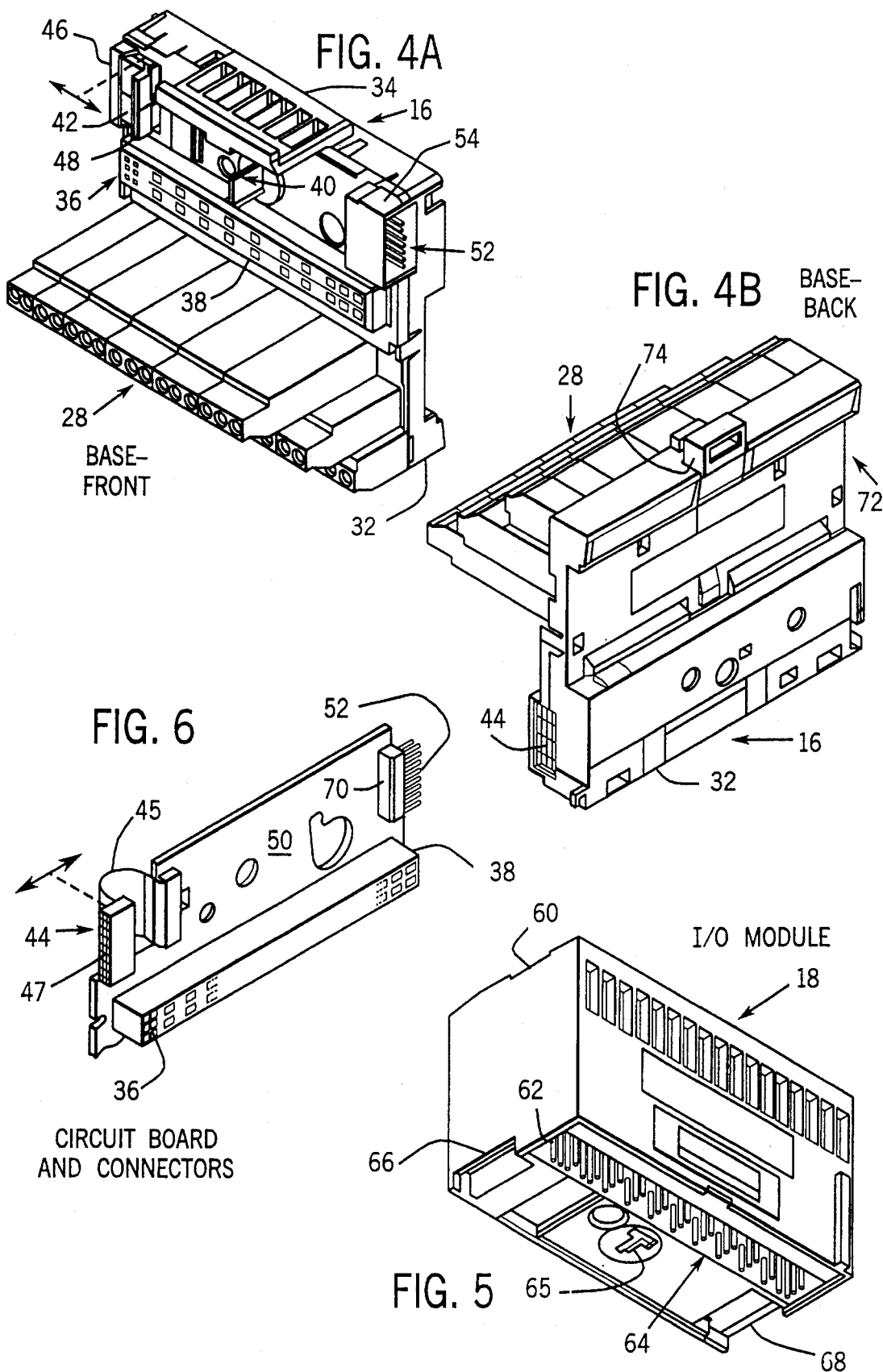

MASTER BLOCK DIAGRAM

SLAVE BLOCK DIAGRAM

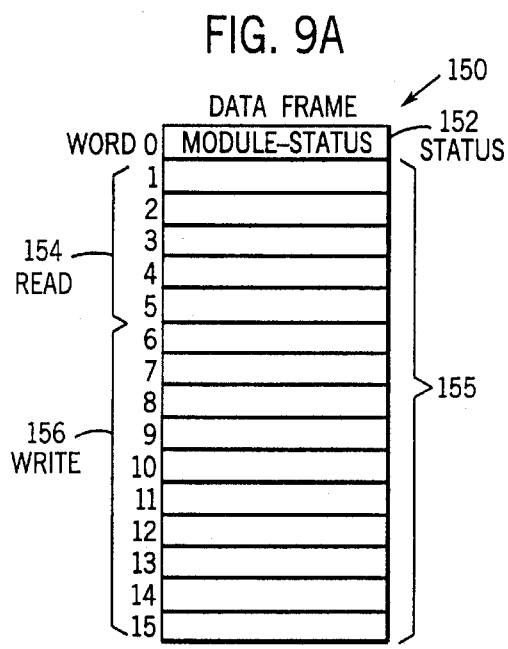
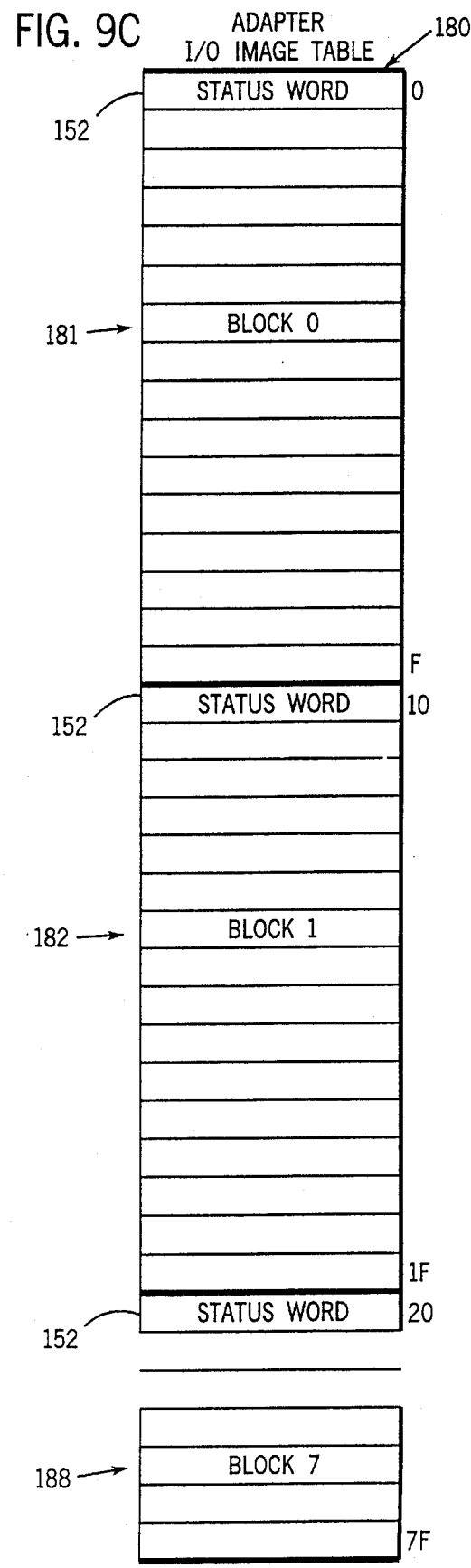

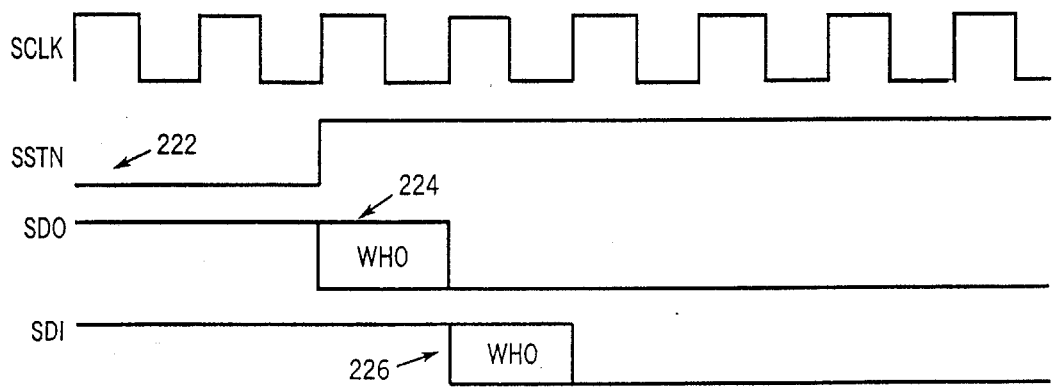
FIG. 11A   START ACCESS 220
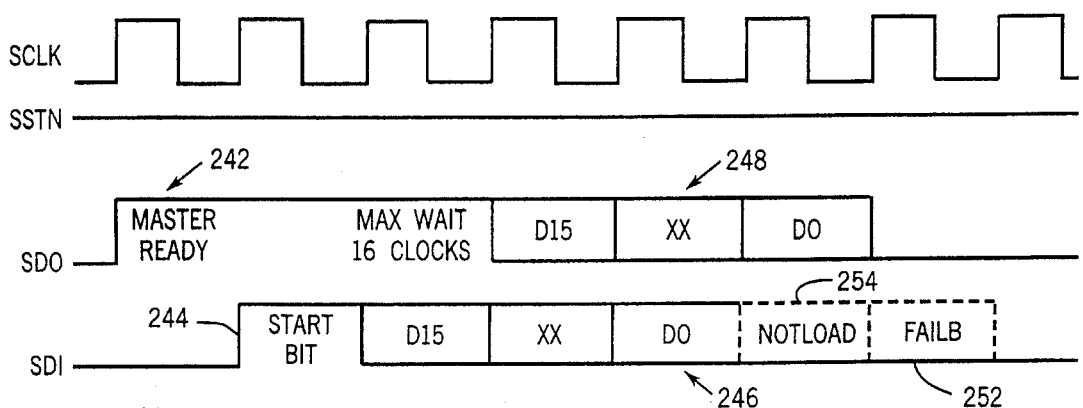
FIG. 11B   READ ACCESS 240
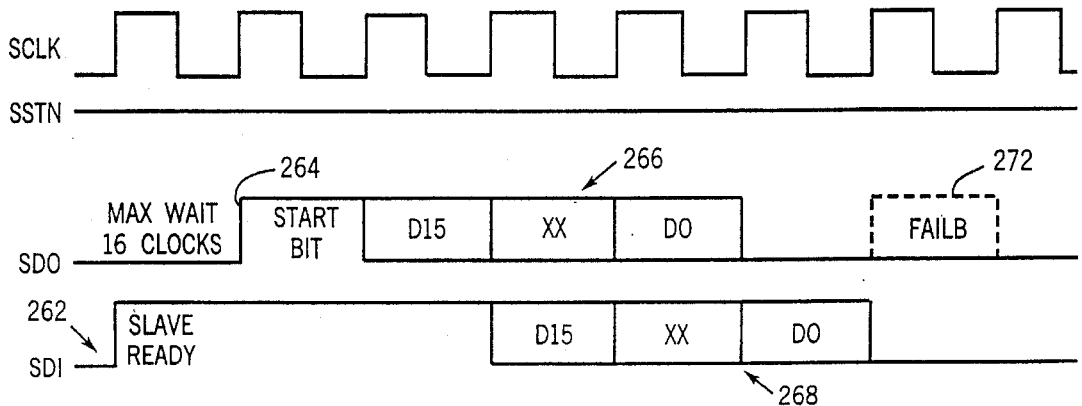
FIG. 11C   WRITE ACCESS 260

ADAPTER
320

I/O MODULE
340

COMMUNICATIONS PROTOCOL FOR USE IN TRANSFERRING DATA OVER A SERIAL BUS

BACKGROUND OF THE INVENTION

The present invention relates to industrial control systems and more particularly to remote input/output (I/O) systems for use in conjunction with industrial control devices such as programmable controllers.

Most control systems for use in automatically controlling production machinery and the like include a central control device such as a programmable logic controller which receives inputs from sensors such as limit switches and provides outputs to actuators for controlling operational machines such as conveyors. The outputs provided to the actuators are determined in accordance with a control program which is continuously executed by the controller and which utilizes the information from the input sensors in setting appropriate control signal outputs. Such systems are in widespread use and are entirely satisfactory except that it is frequently desired to receive inputs and provide outputs from groups of sensors and actuators located at remote locations. In order to avoid the use of large numbers of wires which are bulky and are difficult and costly to install and maintain, remote I/O systems are used which communicate with central control devices over local area networks. Such systems usually include a communications adapter for interfacing with the communications network and several I/O modules for handling different types of I/O signals. The use of remote I/O systems and network communications for transferring information to and from remote locations to central control points simplifies the implementation of control system applications and saves considerable effort and expense.

However, remote I/O systems themselves require flexible and efficient architectures. In particular, remote I/O systems should be designed to allow different types of I/O modules to be quickly and conveniently installed and removed and allow the systems to be rapidly and easily configured and reconfigured. Moreover, remote I/O systems must have efficient communications between the I/O modules and the communications adapter which interfaces with the local area network for transferring information to and from the central control device. Among other things, communications must be rapid and deterministic without requiring burdensome numbers of bus lines for interconnection of the I/O modules and communications adapter.

It is therefore an object of the present invention to provide a remote I/O system having a structure which allows for the rapid and convenient insertion and removal of different types of I/O modules and which allows such systems to be speedily and effortlessly configured and reconfigured.

It is another object of the present invention to provide a remote I/O system in which a common communications backplane can be easily assembled between adjacent units to provide a communications bus over which data can be exchanged between I/O modules and a communications adapter.

It is a further object of the present invention to provide a communications protocol for serial communications over a common backplane between I/O modules and a communications adapter which is highly efficient, straightforward and deterministic.

It is a further object of the present invention to provide a communications system for serially exchanging data over a common backplane between communications modules and adapters which provides for polling to indicate module presence, two-way exchange of data in single data frames and error detection to indicate the presence of corrupted data.

SUMMARY OF THE INVENTION

The present invention constitutes a remote Input/Output (I/O) system having a common backplane for the exchange of data between I/O modules operative for receiving and transmitting I/O signals and a communications adapter for interfacing with a communications network connected to a centrally located control device such as a programmable controller. The basic system includes a communications adapter and a number of I/O block units each of which includes a base and I/O module. The bases of the block units are adapted for being mounted in adjacent in line positions on a common mounting rail along with the communications adapter and for being electrically interconnected in a convenient manner to form a common backplane which enables serial communications between I/O modules installed on the bases and the communications adapter. Serial communications are executed in accordance with a deterministic type communications protocol which provides for polling of I/O modules, two-way exchanges of data in standardized data frames and echoing of data for error detection purposes. Moreover, the remote I/O system allows for different types of I/O modules to be rapidly installed and removed from the system whether, for example, for replacement of faulty modules or for reconfiguration of the system.

The bases of the block units contain circuit boards having bus structures to which the I/O modules installed on the bases are automatically connected upon installation. Pins and pin receptacles which are coupled to the bus structure are mounted on opposite lateral sides of each of the bases for allowing the bus structures of adjacent modules to be interconnected. Moreover, in the preferred embodiment, the pin receptacles are connected to the bus structure by a ribbon cable and otherwise arranged for allowing the pin receptacles to be laterally translated into engagement with pins on an adjacent base in a convenient fashion. After interconnection of adjacent bases and the installation of I/O modules on these bases, the housings of the I/O modules are adapted for physically blocking disengagement of the pin receptacles from the pins of adjacent bases of adjacent block units.

The basic bus structure of the backplane comprises a data out line, a data in line, a set of module select lines and a clock line. A different select line is connected to each of the I/O modules on the system. In accordance with the communications protocol the communications adapter polls all of the module locations corresponding to the different select lines in sequential order in order to initiate communications with all I/O modules on the system in a deterministic fashion. If a full complement of I/O modules is not installed on the system, empty module "locations" are rapidly skipped over. Data communications take place over the data out line and data in line in standardized data frames containing a specified number of data words including a data status word, a number of read words transmitted from modules to the adapter and a number of write words transmitted to modules from the adapter. The number of read words in each data frame is variable depending upon the value of a pointer in the data status word. The individual data bits of each data word transmitted over the backplane are immediately echoed back from the receiving component to the transmitting component so that the integrity of the data can be verified and any errors in the data can be quickly detected.

BRIEF DESCRIPTION OF THE DRAWINGS

FIG. 1 provides a diagrammatic view of the overall mechanical arrangement of a remote I/O system in accordance with the present invention.

FIG. 2 provides a diagrammatic view of a remote I/O system having multiple I/O modules installed in an inline fashion in accordance with the present invention.

FIG. 3 provides an overall block diagram view illustrating the communications links which characterize the remote I/O system of the present invention.

FIGS. 4A and 4B provide elevated perspective views of the front and back sides of bases (or base units) which interconnect to form the system backplane and on which I/O modules are removably mounted in accordance with the remote I/O system of the present invention.

FIG. 5 provides a perspective view of an I/O module in accordance with the remote I/O system of the present invention.

FIG. 6 provides a diagrammatic view of the circuit board, bus structure and backplane elements of a base (or base unit) in accordance with the remote I/O system of the present invention.

FIGS. 9A–C show the data structure of the data frames, data status words and adapter I/O image table which characterize communications over the system backplane in accordance with the remote I/O system of the present invention.

FIGS. 11A–C provide timing diagrams of the signal pattern sequences for start access, read access and write access operations over the common system backplane between the adapter and I/O modules in accordance with the remote I/O system of the present invention.

DESCRIPTION OF THE PREFERRED EMBODIMENT

Figure 7:
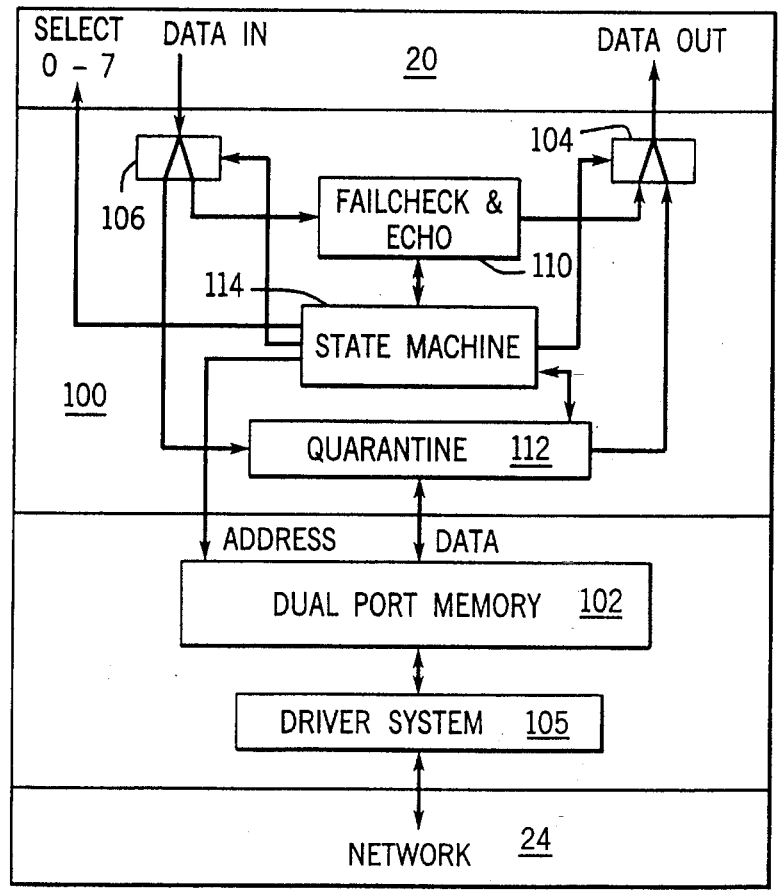
FIG. 7 provides a block diagram view of the electronic components of a communications adapter (master) in accordance with the remote I/O system of the present invention.

Referring now to FIG. 1, a modular Input/Output (I/O) system 10 is shown as including a communications adapter 12 and two I/O block units 14a and 14b which are connected for local communications purposes to a serial bus forming a common system backplane 20 between the units 14a and 14b and the adapter 12. The communications adapter 12 is connected at terminals 22 to a power supply and ground and is connected at terminals 26 onto an external communications link 24 which may comprise any of a variety of local area networks (LANs) suitable for use in industrial control applications. The I/O block units 14a and 14b include base or base units 16a and 16b through which the backplane 20 extends and include plug-in I/O modules 18a and 18b which can be readily installed onto the base units 16a and 16b and which may be selected to handle a variety of I/O signals. The base units 16a and 16b also include sets of terminals 28a and 28b for connection to actual input and/or output devices such as sensors or actuators.

Referring now to FIG. 2, the modular I/O system 10 may include up to eight I/O block units 14a–14h which are mounted in laterally adjacent in line positions on a mounting rail 30 such as a DIN rail. The individual plug-in I/O modules 18a–18h corresponding to the block units 14a–14h may be of a variety of different types adapted for handling either inputs or outputs comprising either analog, discreet or digital signals. The adapter 12 is always mounted at the left end of the line of I/O block units 14a–14h with one adapter 12 having the capacity for acting as a communications master with respect to eight or any lesser number of I/O block units 14a–14h which operate as communications slaves.

Referring now to FIG. 3, in the modular I/O system 10 the base units 16a, 16b–16h are interconnected to form a local serial bus system backplane 20 which also interconnects with the communications adapter 12. The backplane 20 includes a differential clock line, a reset line, a group of select lines, a data out line, a data in line, a power supply line and a ground line. The I/O modules 18a, 18b–18h are installed onto the base units 16a, 16b–16h and thereby coupled to the backplane 20 for local communications with the adapter 12. The adapter 12 exchanges data with I/O modules 18a, 18b–18h via the base units 16a, 16b–16h over the backplane 20 and with remote control devices such as programmable logic controllers over the network communications link 24 which provides higher bandwidth communications with such devices.

Referring now to FIG. 4A, an individual base unit 16 includes a frame 32 in which the terminals 28 are disposed in three tiers and includes a latch 34 which is attached to the frame 32 for gripping an I/O module 18 and holding it in position on the base unit 16. A set of pin receptacles 36 are deployed across a connector 38 for making electrical contact with matching pin connectors in the bottom of any I/O modules 18 which may be installed onto the base unit 16. A key 40 for matching with a keyhole 65 (shown later in FIG. 5) in the bottom of the I/O modules 18 is mounted on the base unit 16 for making sure that the base unit 16 is compatible with any particular I/O module 18 that may be installed on it.

As shown in FIG. 4B, the bottom of the base 16 includes a channel 72 for accommodating a mounting rail 30 on which the base 16 can be locked into position through the operation of a latch 74. The latch 74 is spring loaded for movement in and out with respect to the channel 72 in order to be able to grip onto the mounting rail 30. The latch 74 is adapted for allowing the base unit 16 to be snapped into position on the rail 30. Thereafter, the latch 74 bears down underneath the edge of the mounting rail 30 thereby locking the base 16 into position. A casing 42 for mounting a set of pin receptacles 44 is disposed on one lateral side of the base unit 16 within a rectangular guide bracket 46 which allows for the casing 42 and receptacles therein to be laterally translated. A thumb lever 48 is attached to the casing 42 and extends upward from the base unit 16 to allow the casing 42 to be moved with a small amount of manually applied force. A set of electrical pins 52 are mounted in another casing 54 which is attached to the other lateral side of the base unit 16 opposite from the casing 42. The casing 42 and pin receptacles 44 are adapted for mating with pins such as the pins 52 on an adjacent base unit of another I/O block unit. Likewise, the pins 52 in the casing 54 are adapted for mating with receptacles such as the pin receptacles 44 in the casing 42 on an adjacent base unit of another I/O block unit.

Once a set of block units 14 are mounted in adjacent in line positions on a mounting rail 30, the casings 42 and pin receptacles 44 can be slid laterally outward from their base units 16 into contact and engagement with pins 52 on all adjacent base units 16 (of different I/O block units) for electrically interconnecting all of the base units 16 to form a common backplane 20.

As better shown in FIG. 6, each base unit 16 includes a circuit board 50 on which a bus structure is disposed for electrically interconnecting the pin receptacles 44, pins 52 and pin receptacles 36 (for connecting to an I/O module 18). A pin support bar 70 (which is normally secured within the casing 54) is mechanically attached to the circuit board 50 in a fixed position while the pins 52 are electrically coupled to the bus structure on the circuit board 50. A receptacle support bar 47 (which is normally secured within the casing 42) is mechanically connected by a ribbon cable 45 to the circuit board 50 which allows for lateral movement. The ribbon cable 45 also serves to electrically interconnect the pin receptacles 44 to the bus structure on the circuit board 50 and enables the receptacles 44 to be laterally translated into engagement with pins 52 on adjacent I/O block units. After engagement of all pin receptacles 44 with all pins 52 of all adjacent block units 14 in an I/O system 10, the I/O modules 18 can be latched onto the base units 16 using latches 34 to complete the I/O system 10.

Referring now to FIG. 5, an individual I/O module 18 comprises a block housing 60 for enclosing electrical components, a connector 62 including pins 64 for interconnecting with the pin receptacles 36 in a connector 38 on a base unit 16, a keyhole 65 for mating with a key 40, a recess 66 for providing a space to accommodate the casing 42 and lever 48 and a recess 68 for providing a space to accommodate the casing 54. However, the recess 66 is relatively shallow in its lateral dimensions so that it obstructs any lateral movement by the casing 42 which might result in disengagement between receptacles 44 and pins 52 of an adjacent base 16 once the I/O module 18 is in place on the base 16.

Referring now to FIG. 7, a communications adapter 12 includes electronic components expressed on an ASIC chip 100, a dual port RAM memory 102 in which I/O data is stored and a conventional communications driver system 105. The ASIC chip 100 includes a pair of multiplexors 104 and 106 for interfacing with the data out and data in lines of the backplane 20. The ASIC chip 100 also includes a fail check and echo circuit 110 for echoing back data received from I/O modules 18 bit by bit for error detection purposes and for generating error acknowledgement signals for transmission to I/O modules whenever errors are detected in echo data. A quarantine circuit 112 stores incoming and outgoing data pending data integrity verification. In particular, the quarantine circuit 112 stores incoming data until the echo data transmitted on the data out line in response to the incoming data is properly acknowledged by the transmitting I/O module 18 at which time the data can be transferred to the dual port memory 102. Further, the quarantine circuit 112 stores outgoing data for bit by bit comparison with incoming echo data. A state machine 114 controls the multiplexors 104 and 106 as well as the fail check and echo and quarantine circuits 110 and 112 while providing appropriate addresses for reading and writing information from and into the dual port memory 102. The state machine 114 also generates the select and reset signals transmitted over the select and reset lines of the backplane 20 for initiating communications with selected I/O modules 18.

In operation, incoming data from an I/O module 18 is directed through the multiplexor 106 to the fail check and echo circuit 110 and the quarantine circuit 112. The incoming data is echoed out by the circuit 110 through the multiplexor 104 to the transmitting I/O module 18 for error detection purposes. If an error acknowledgement signal is not received and data integrity is verified in response to the echo data, the state machine 114 directs the data from the quarantine circuit 112 to the appropriate address in the dual port memory 102. The data can then be directed over the communications link 24 by operation of the driver system 105. Conversely, data for transmission to an I/O module 18 which may frequently arrive in the memory 102 from over the communications link 24 is fetched from the dual port memory 102 under direction of the state machine 114 and written into the quarantine circuit 112 from where it is transmitted out through the multiplexor 104 to the proper receiving module 18. Echo data which is received in response to the outgoing data is directed through the multiplexor 106 to the quarantine circuit 112 for comparison with the data originally transmitted. In response to the results of this comparison operation the state machine 114 may direct the fail check and echo circuit 110 to provide an error acknowledgement signal out through the multiplexor 104 to the receiving module 18.

Figure 8:
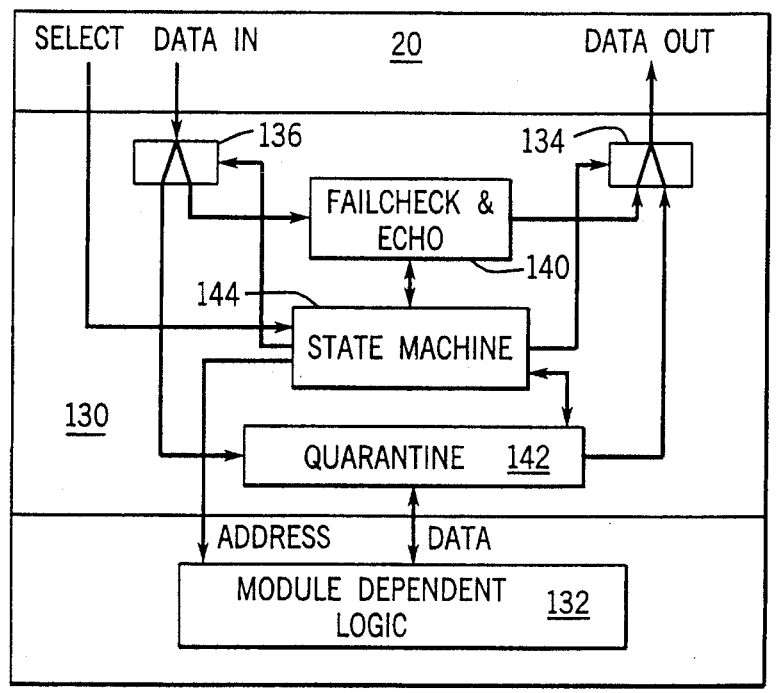
FIG. 8 provides a block diagram view of the electronic components of an I/O module (slave) in accordance with the remote I/O system of the present invention.

Referring now to FIG. 8, an I/O module 18 includes electronic components expressed on an ASIC chip 130 and conventional type logic circuitry 132 for processing actual I/O signals of different types depending on the functionality of the module. The ASIC chip 130 includes a pair of multiplexors 134 and 136 for interfacing with the data out and data in lines of the backplane 20. The ASIC 130 also includes a fail check and echo circuit 140 for echoing back data bit by bit for error detection purposes and for generating error acknowledgement signals for transmission to the adapter 12 whenever errors are detected in echo data. The quarantine circuit 142 stores incoming and outgoing data pending data integrity verification. In particular, the quarantine circuit 142 stores incoming data until the echo data transmitted on the data out line in response to the incoming data is properly acknowledged by the transmitting adapter 12 at which time the data can be transferred to the image table of the logic circuitry 132. Further, the quarantine circuit 142 stores outgoing data for bit by bit comparison with incoming echo data. The state machine 144 controls the multiplexors 134 and 136, as well as the fail check and echo circuit 140 and the quarantine circuit 142, while providing appropriate addresses for reading and writing information from and into the logic circuitry 132. The operation of the ASIC chip 130 and logic circuitry 132 is similar to the operation of the ASIC chip 100 and dual port memory 102 as previously described except that the state machine 144 is responsive to a (single) select signal for initiating communications.

Figure 9B:
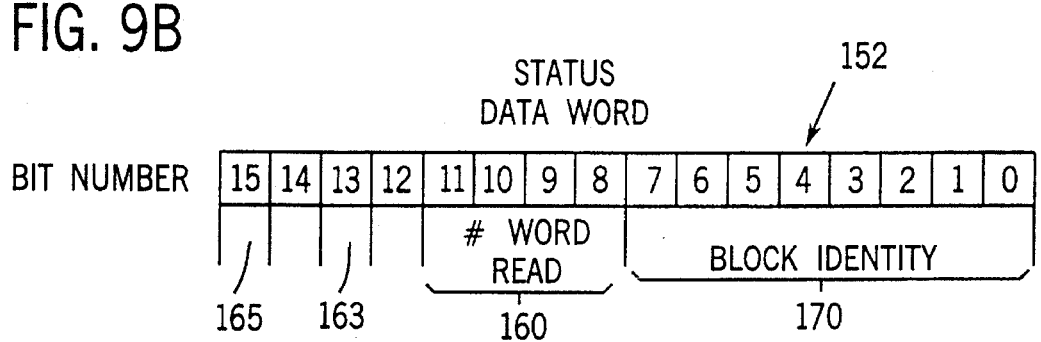

Referring now to FIGS. 9A–C, data is exchanged between the communications adapter 12 and the I/O modules 18 making up the modular I/O system 10 in data frames 150 containing sixteen data words which each contain sixteen bits. As more particularly shown in FIG. 9A, the first word in each data frame comprises a status data word 152 containing various pieces of control type information. The other fifteen words 155 in each data frame 150 may be either read words 154 or write words 156. Each data frame 150 is divided between a variable number of read words 154 and write words 156 in accordance with a pointer 160 in the status data word 152 for each data frame 150. As shown in FIG. 9B, each status data word 152 contains eight bits which form a block identity byte 170 indicating the specific type of I/O module 18 sending the message. The four bits following the block identity byte 170 are used as a pointer 160 for indicating the number (N) of read words in the data frame 150 following the status word 152 and also specifying the number of write words (15-N). The data frame 150 may thereby contain variable numbers of read words 154 which are sent to the adapter 12 from the I/O module 18 and write words 156 which are sent from the adapter 12 to the module 18. Each data frame 150 can therefore represent a two-way exchange of information between a communications adapter 12 and an I/O module 18. The four remaining bits in the status word 152 following the pointer 160 are used as error bits. In particular, bit number thirteen 163 comprises a "fail" error bit used to indicate data transmission failures and bit number fifteen 165 comprises a "no module" error bit used to indicate (in the I/O image table of the dual port memory 102) when I/O modules are not present at given I/O system locations. These error bits are primarily a feature of the status data words for I/O modules as they exist in the I/O image table 180 of the dual port memory 102 and are usually set by the state machine 114 as error flags as will be hereinafter described.

Data frames 150 represent information exchanged between the adapter 12 and I/O modules 18 in the modular I/O system 10. Each data frame 150 for each module 18 corresponds to a specific block of memory in the dual port memory 102 of the adapter 12 of the system 10. As shown in FIG. 9C, the dual port memory 102 contains an I/O image table 180 divided into separate data blocks 181, 182–188 which correspond to data frames for every I/O module which may be present on the system 10. The data blocks 181, 182–188 contain all of the data words in each data frame 150 starting with a status word 152. The data blocks 181, 182–188 in the I/O image table 180 are updated with status and I/O data as communications take place between adapter 12 and I/O modules 18 and between the adapter 12 and any external devices providing I/O information to the adapter 12 over the network communications link 24.

Figure 10:
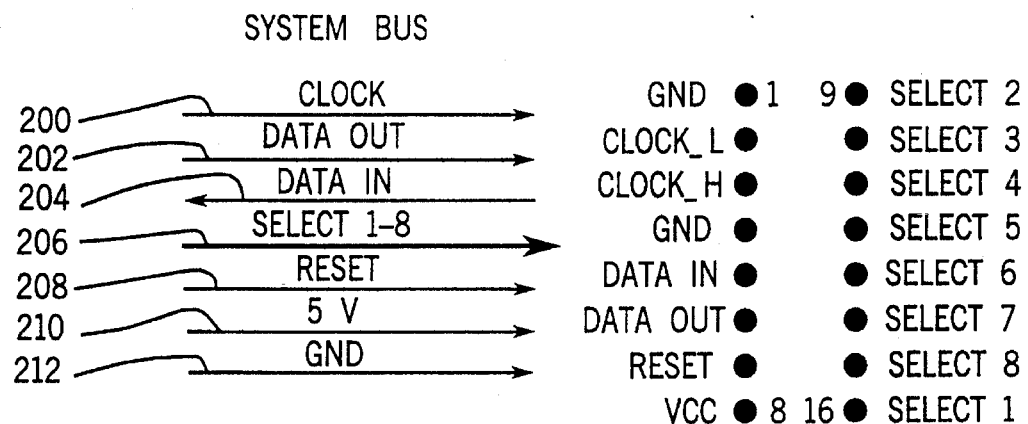
FIG. 10 provides a breakdown of the bus structure of the common system backplane in accordance with the remote I/O system of the present invention.

Referring now to FIG. 10, the bus structure of the backplane 20 includes seven different types of signal lines. More specifically, the backplane 20 includes a differential clock line 200 over which a clock signal is sent out from the adapter 12 to all modules 18 in the system 10, a data out line 202 over which data is sent out from the adapter 12 to modules 18 in the system 10, a data in line 204 over which data is received by the adapter 12 from modules 18 in the system 10, a set of eight different select lines 206 which the adapter 12 uses to target specific I/O modules 18 (or rather I/O module "locations") for communications purposes, a reset line 208, a power supply line 210 and a ground line 212. The select lines 206 allow the adapter 12 to select specific I/O modules 18 on a system 10 for one to one communications without the modules 18 having to be configured by the user in any way.

Referring now to FIG. 11A, a start access signal sequence 220 is shown for initiating communications between an adapter 12 ("master") and a specific I/O module 18 once that module has been targeted for communications. The adapter 12 starts the sequence by asserting (or "resetting") the specific select line to which the targeted I/O module 18 (or rather the targeted module "location") is connected by pulling this particular select line 206 low for two clock cycles at point 222. Immediately thereafter the adapter 12 pulls the data out line 202 low at point 224 and waits for a response from the selected I/O module 18 (or target module "location"). If present, the selected I/O module 18 responds by pulling the data in line 204 low at point 226 to indicate that it is ready to communicate with the adapter 12. If no response is received on the data in line 204, then the adapter 12 sets the no module error bit 165 in the status word 152 of the appropriate memory block in its dual port memory 102 (corresponding to the data frame 150 which would have been exchanged with the module 18 had the module been present) and immediately selects and begins a start access sequence with the next I/O module 18.

The adapter 12 targets all of the I/O module "locations" for communications by sequentially pulling each of the select lines 206 low and engaging in associated start access sequences in a round robin fashion. Whenever an I/O module 18 is operational and present at a given location (i.e. it is in place and connected to the select line being selected) communications are initiated pursuant to the start access sequence. However, if no I/O module 18 is present, the start access sequence is quickly completed so that the adapter 12 can move on to attempt a start access sequence at the next I/O module location. In effect, the adapter 12 uses the start access sequence to "poll" all of the I/O module "locations" corresponding to all of the select lines 206 one by one in sequential order and initiate communications with any modules that may happen to be present on the system while quickly skipping over "locations" where modules are not in fact present.

Referring now to FIG. 11B, a read access signal sequence 240 is shown by which a data word can be transferred from an I/O module 18 ("slave") to an adapter 12 (after a start access sequence 220 has been successfully completed). The adapter 12 begins by lifting the data out line 202 high at point 242 to indicate to the I/O module 18 that it is ready to receive a data read word. In response, the selected I/O module 18 begins the transmission of a data read word with a start bit 244 followed by sixteen data bits 246. If the start bit 244 isn't received before sixteen clock cycles after the adapter 12 signals it is ready to communicate then the communications attempt is terminated and the adapter 12 moves on to begin a start access sequence with a different I/O module 18. In order to guarantee data integrity all bits are echoed from the adapter 12 back to the selected I/O module 18 as shown at point 248 to allow for the detection of errors in the transmission of the data. If such an error is detected by the ASIC chip 130 at the I/O module 18, then the second bit after the end of the data read word is set high by the I/O module 18 and transmitted to the adapter 12 as a "fail bit" 252 in order to provide an error acknowledge signal indicating that a data transmission error has occurred. Whenever the adapter 12 detects such a fail bit 252 following a transmitted data read word, it rejects the data word and aborts the transfer of the information from its quarantine circuit 112 to the dual port memory 102. It also sets the fail error bit 163 (bit number 13) in the status word of the appropriate memory block in its dual port memory 102 corresponding to the data frame for the selected I/O module 18 as an error flag. It should also be noted that the first data bit 254 after the end of the data read word may also be set high by the I/O module to indicate that particular data word should not be transferred to the I/O image table 180. This option allows word by word selectivity with respect to the updating of the I/O image table 180 with data from the I/O modules 18.

Referring now to FIG. 11C, a write access signal sequence 260 is shown by which information is transferred from an adapter 12 to an I/O module 18 (after a start access sequence 220 has been successfully completed). The I/O module 18 begins by lifting the data in line 204 high at point 262 to indicate to the adapter module 12 that it is ready to receive a data write word. In response, the adapter module 12 begins the transmission of a data word with a start bit 264 followed by sixteen data bits 266. However, if the selected I/O module 18 does not signal that it is ready to receive data before sixteen clock cycles after the end of the start access sequence 220 then the communications attempt is terminated and the adapter 12 moves on to begin a start access sequence with a different I/O module 18. In order to guarantee data integrity all bits are echoed from the selected I/O module 18 back to the adapter 12 as shown at point 268 to allow for the detection of errors in the transmission of the data. If such an error is detected by the ASIC chip 100 at the adapter module 12, then the second bit at the end of the data write word is set high by the adapter module 12 and transmitted to the selected I/O module 18 as a "fail bit" 272 in order to provide an error acknowledge signal indicating that a data transmission error has occurred. Whenever the I/O module 18 detects such a fail bit 272 following a transmitted data write word it rejects the data word and aborts the transfer of the information from its quarantine circuit 142 to its logic circuitry 132. Meanwhile, the adapter 12 sets the fail error bit 163 (bit number 13) in the status word 152 of the appropriate memory block and its dual port memory 102 corresponding to the data frame for the selected I/O module 18 as an error flag.

Figure 12A:
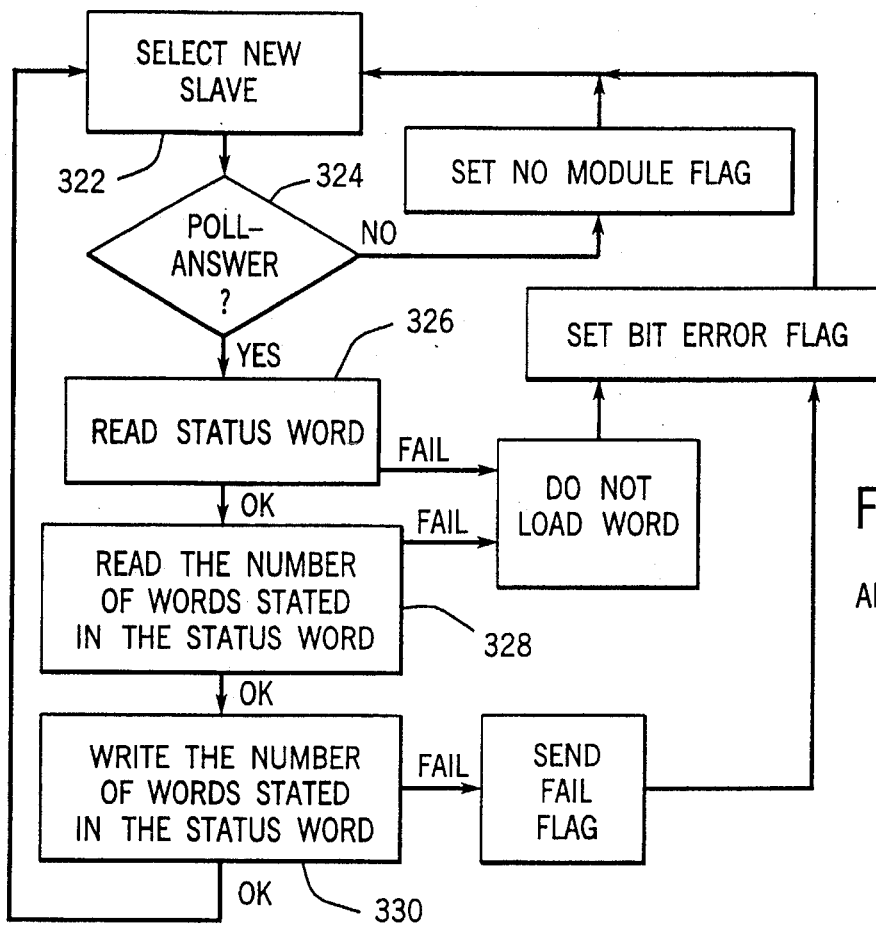
FIGS. 12A and 12B provide flowcharts showing the overall procedures which are followed by the communications adapter and I/O modules as master unit and slave units, respectively, in implementing communications over the common system backplane in accordance with the remote I/O system of the present invention.

Referring now to FIG. 12A, the overall communications sequence 320 for an adapter 12 (master) is summarized as including five basic steps 322, 324, 326, 328 and 330. First, a new I/O module location is selected as the target for a communications attempt as shown in step 322. Pursuant to step 324 this location is then polled to verify whether an I/O module 18 is in fact present at the selected location. If an I/O 18 module is present at the selected location, the adapter 12 then proceeds to step 326 and receives the status data word 152 from the selected I/O module 18. Thereafter, in steps 328 and 330 the adapter 12 receives the number of data read words 154 indicated by the pointer 160 in the status word 152 from the selected I/O module 18 and writes the number of data write words 156 remaining to the selected I/O module 18, respectively.

In the event that no module is present at the selected location polled in accordance with step 324, then the adapter 12 sets the appropriate no module error bit 165 in the I/O image table 180 as an error flag. If data read words transmitted pursuant to steps 326 and 328 are acknowledged by the selected I/O module 18 with fail bits, the adapter 12 aborts loading the data words in the memory 102 and sets the appropriate fail error bit in the I/O image table 180 as an error flag. If errors are detected pursuant to the echoing procedure in data words transmitted by the adapter 12 to an I/O module 18 pursuant to step 330, then the adapter 12 acknowledges the individual data write words indicated as containing corrupted information with fail bits and sets the fail error bit in I/O image table 180 as an error flag. Whenever errors are detected the program automatically jumps back to step 322 for selection of a new module location for communications purposes.

Figure 12B:
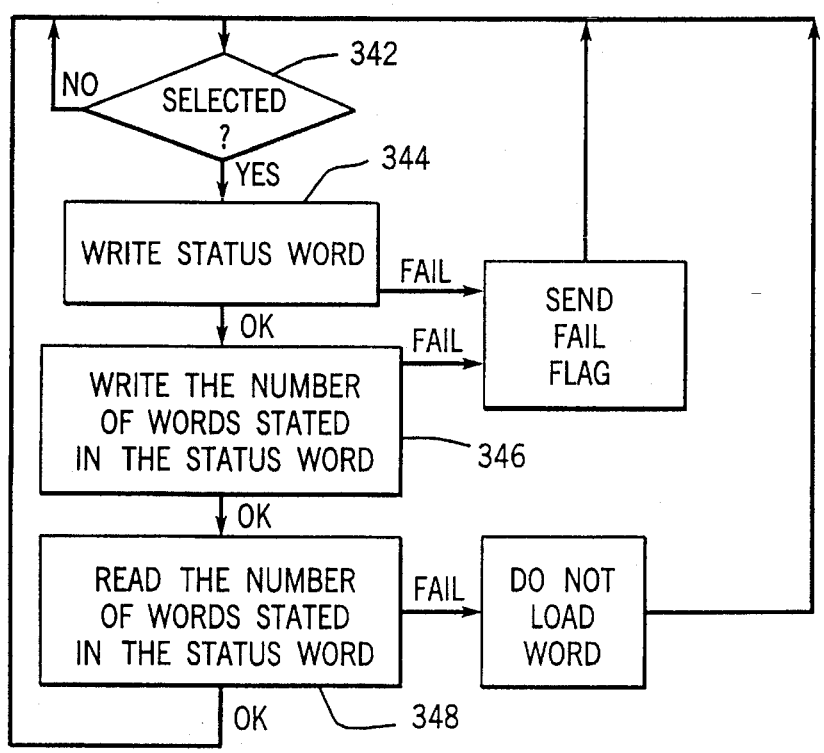

Referring now to FIG. 12B, the overall communications sequence 340 for an I/O module 18 ("slave") is summarized as including four basic steps 342, 344, 346 and 348. The module 18 waits to respond to being selected as a target for a communications attempt by the adapter 12 as shown in step 342. If the I/O module 18 is selected for communications, the I/O module 18 then proceeds to step 344 and transmits a status data word 152 to the adapter 12. Thereafter, in steps 346 and 348 the I/O module 18 transmits the number of data read words 154 indicated by the pointer 160 in the status data word 152 to the adapter 12 and receives the number of data write words 156 remaining from the adapter 12, respectively. If errors are detected pursuant to the echoing procedure in data words written by the I/O module 18 to the adapter 12 pursuant to steps 344 and 346, then the I/O module 18 acknowledges the individual data words indicated as containing corrupted information with fail bits 272. If data write words received pursuant to step 348 are acknowledged by the adapter 12 with fail bits 252, the I/O module 18 aborts loading these data words in its logic circuitry 132. Whenever errors are detected the program automatically jumps back to step 342 for selection of a new I/O module location for communication purposes.

The start access sequence 220, I/O image table 180 and state machine 114 work together in enabling the insertion and removal of I/O modules 18 under power. After the I/O system 10 is initialized the start access sequence 220 allows module "locations" from which modules 18 have been removed to be identified by no module error bits in the status word corresponding to the missing module in the appropriate memory block in the I/O image table 180. Whenever error bits 163 and 165 are jointly set as indicating a newly "missing" module, the data in the memory block corresponding to the missing module is "frozen" in its current state pending insertion of a new module at the missing module's location. Modules can thereby be inserted and removed under power with a minimum of disruption to the I/O image table 180 and the I/O data in use by the remote I/O system 10.

While particular embodiments of the present invention have been shown and described, it should be clear that changes and modifications may be made to such embodiments without departing from the true scope and spirit of the invention. It is intended that the appended claims cover all such changes and modifications.

I claim:

1. A method for operating a central communications adapter to communicate with one selected I/O module utilizing a shared data out line and a shared data in line, in which the shared data out line and the shared data in line may be shared by other nonselected I/O modules, the method comprising the steps of:

a) performing a start access protocol with the selected I/O module to enable the selected I/O module as an active I/O module, thereby enabling the active I/O module to actively use the shared data in line and the shared data out line for communicating with the central communications adapter, the start access protocol including the substeps of;

i) asserting a select line to the selected I/O module, the select line being connected only to the selected I/O module;

ii) sending a polling signal on the shared data out line; and iii) receiving a polling response signal back from the selected I/O module on the shared data in line to indicate the presence and active functioning of the selected I/O module; and b) while maintaining assertion of the select line, and only if a correct polling response signal is received from the selected I/O module in step (a)(iii), exchanging at least one I/O data frame with the active I/O module utilizing at least one of said shared data in line and shared data out line, in which the I/O data frame is a predetermined, fixed number of data words and in which the I/O data frame exchange includes the steps of;

c) performing a read access in which input data is received from the active I/O module on the shared data line, the read access including the steps of;

d) receiving a first input data word which includes a count field specifying the number of additional input data words to be received during the read access; and e) receiving zero or more additional input data words as specified by the count field of the first input data word; and f) performing a write access in which output data is sent to the active I/O module on the shared data out line, the write access including the step of;

g) sending zero or more output data words such that the total number of data words exchanged during the combined read access and write access is equal to the fixed data frame size.

2. The method of claim 1 in which the shared data in line and the shared data out line are both bit serial communication lines, in which input is received during the read access as an input bit stream, and in which the central communications adapter further performs the steps of:

h) echoing bitwise from the input bit stream back to the active I/O module on the shared data out line; and i) receiving a data accuracy indication from the active I/O module indicating results of a comparison between the input bit stream and the bitwise echo, the data accuracy indication being received as a bitwise signal on the shared data in line trailing the input bit stream.

3. The method of claim 1 in which the shared data in line and the shared data out line are both bit serial communication lines, in which output is sent during the write access as an output bit stream which is echoed bitwise back from the active I/O module on the shared data in line, and in which the central communications adapter further performs the step of comparing the bitwise echo to the corresponding output bit stream to detect transmission errors.

4. A method for operating a selected I/O module to communicate with a central communications adapter utilizing a shared data out line and a shared data in line, in which the shared data out line and the shared data in line may be shared by other nonselected I/O modules, the method comprising the steps of:

a) participating in a start access protocol with the central communications adapter to enable the selected I/O module as an active I/O module, thereby enabling the active I/O module to actively use a shared data in line and a shared data out line for communicating with the central communications adapter, the start access protocol including the substeps of;

i) detecting assertion of a select line from the central communications adapter, the select line being connected only to the selected I/O module;

ii) receiving a polling signal on the shared data out line from the central communications adapter; and iii) sending a polling response signal back to the central communications adapter on the shared data in line to indicate the presence and active functioning of the selected I/O module; and b) while the select line remains asserted, exchanging at least one I/O data frame with the central communications adapter utilizing at least one of said shared data in line and shared data out line, in which the I/O data frame is a predetermined, fixed number of data words and in which the I/O data frame exchange includes the steps of:

c) performing a read access in which in put data is sent to the central communications adapter on the shared data in line, the read access including the steps of;

d) sending a first input data word which includes a count field specifying the number of input data words to be sent during the read access; and e) sending zero or more additional input data words as specified by the count field of the first input data word; and f) performing a write access in which output data is received from the central communications adapter on the shared data out line, the write access including the step of;

g) receiving zero or more output data words such that the total number of data words exchanged during the combined read access and write access is equal to the fixed data frame size.

5. The method of claim 4 in which the shared data in line and the shared data out line are both bit serial communication lines, in which input is sent during the read access as an input bit stream, in which the central communications adapter performs a bitwise echo during the read access, echoing the input bit stream back onto the shared data out line, and in which the active I/O module further performs the steps of:

h) comparing the bitwise echo on the shared data out line to the input bit stream being sent on the shared data in line; and i) sending a data accuracy indication to the central communications adapter as a bitwise signal on the data in line trailing the input bit stream, the data accuracy indication being based upon said comparison in step (h) between the input bit stream and the bitwise echo.

6. The method of claim 4 in which the data in line and the data out line are both bit serial communication lines, in which output is received during the write access as an output bit stream, and in which the active I/O module further performs the step of echoing bitwise the output bit stream received on the shared data out line back to the central communications adapter on the shared data in line.

* * * * *